United States Patent
Issakov et al.

(10) Patent No.: US 9,078,145 B2
(45) Date of Patent: *Jul. 7, 2015

(54) NETWORK-BASED LOCATION OF MOBILE TRANSMITTERS

(71) Applicant: TruePosition, Inc., Berwyn, PA (US)

(72) Inventors: Simon Issakov, Wayne, PA (US); Rashidus S. Mia, Phoenixville, PA (US); Robert J. Anderson, Phoenixville, PA (US)

(73) Assignee: TruePosition, Inc., Berwyn, PA (US)

( * ) Notice: Subject to any disclaimer, the term of this patent is extended or adjusted under 35 U.S.C. 154(b) by 97 days.

This patent is subject to a terminal disclaimer.

(21) Appl. No.: 13/865,015

(22) Filed: Apr. 17, 2013

(65) Prior Publication Data
US 2013/0229936 A1     Sep. 5, 2013

Related U.S. Application Data

(63) Continuation of application No. 12/842,861, filed on Jul. 23, 2010, now Pat. No. 8,526,391.

(51) Int. Cl.
*H04W 24/02*     (2009.01)
*G01S 5/02*     (2010.01)
*G01S 5/06*     (2006.01)
*H04W 24/10*     (2009.01)
*H04W 28/18*     (2009.01)
(Continued)

(52) U.S. Cl.
CPC .............. *H04W 24/02* (2013.01); *G01S 5/0221* (2013.01); *G01S 5/06* (2013.01); *H04W 24/10* (2013.01); *H04W 28/18* (2013.01); *H04W 64/00* (2013.01); *H04W 72/12* (2013.01)

(58) Field of Classification Search
CPC ....... G01S 5/0221; G01S 5/06; H04B 1/1027; H04W 24/02
USPC ................ 370/252, 328, 330, 498; 455/456.1
See application file for complete search history.

(56) References Cited

U.S. PATENT DOCUMENTS

| 6,115,599 A | 9/2000 | Stilp |
| 6,295,455 B1 | 9/2001 | Fischer et al. |

(Continued)

FOREIGN PATENT DOCUMENTS

| WO | WO 2010/052673 A1 | 5/2010 |
| WO | WO 2010/124031 | 10/2010 |

OTHER PUBLICATIONS

3$^{rd}$ Generation Partnership Project (3GPP); "UTDOA Overview and input for Response to RAN1 LS"; TSG RAN WG1; Jeju, Korea; Meeting #58; Nov. 13, 2009; R2-096819; 6 pages.

(Continued)

*Primary Examiner* — Donald Mills
*Assistant Examiner* — Henry Baron
(74) *Attorney, Agent, or Firm* — Baker & Hostetler LLP

(57) ABSTRACT

In an overlay, network-based, wireless location system, LMUs typically co-located with BTSs are used to collect radio signaling both in the forward and reverse channels for use in TDOA and/or AOA positioning methods. Information broadcast from the radio network and by global satellite navigation system constellations can be received by the LMU and used to reduce the difficulty of initial system configuration and reconfiguration due to radio network changes.

13 Claims, 10 Drawing Sheets

(51) Int. Cl.
  *H04W 64/00* (2009.01)
  *H04W 72/12* (2009.01)

(56) References Cited

U.S. PATENT DOCUMENTS

| | | | |
|---|---|---|---|
| 6,334,059 | B1 | 12/2001 | Stilp et al. |
| 6,463,290 | B1 | 10/2002 | Stilp et al. |
| 6,519,465 | B2 | 2/2003 | Stilp et al. |
| 6,782,264 | B2 | 8/2004 | Anderson |
| 6,950,664 | B2 | 9/2005 | Chen et al. |
| 7,167,713 | B2 | 1/2007 | Anderson |
| 7,689,240 | B2 | 3/2010 | Anderson |
| 7,783,299 | B2 | 8/2010 | Anderson et al. |
| 8,242,959 | B2 | 8/2012 | Mia et al. |
| 8,559,491 | B2 * | 10/2013 | Chevalier et al. ............ 375/224 |
| 2002/0086682 | A1 | 7/2002 | Naghian |
| 2009/0143018 | A1 | 6/2009 | Anderson et al. |
| 2009/0327828 | A1 | 12/2009 | Ojala et al. |
| 2010/0027521 | A1 | 2/2010 | Huber et al. |
| 2010/0135273 | A1 | 6/2010 | Kim |
| 2011/0053588 | A1 | 3/2011 | Al-Khudairi et al. |
| 2011/0116436 | A1 * | 5/2011 | Bachu et al. ................. 370/312 |
| 2011/0149774 | A1 | 6/2011 | Chen et al. |
| 2011/0211467 | A1 | 9/2011 | Bhat |
| 2011/0222428 | A1 | 9/2011 | Charbit et al. |
| 2011/0260863 | A1 * | 10/2011 | Hooli et al. ............ 340/539.32 |
| 2012/0052835 | A1 | 3/2012 | Bull et al. |
| 2012/0082087 | A1 | 4/2012 | Takano |
| 2012/0099503 | A1 | 4/2012 | Guo et al. |
| 2012/0127890 | A1 | 5/2012 | Islam |
| 2012/0163287 | A1 | 6/2012 | Raaf et al. |
| 2012/0165038 | A1 | 6/2012 | Soma et al. |
| 2012/0178482 | A1 | 7/2012 | Seo et al. |
| 2012/0178485 | A1 | 7/2012 | Zeira et al. |
| 2012/0182874 | A1 | 7/2012 | Siomina et al. |
| 2012/0182977 | A1 | 7/2012 | Hooli et al. |
| 2012/0213105 | A1 | 8/2012 | Wigren et al. |

OTHER PUBLICATIONS

3$^{rd}$ Generation Partnership Project (3GPP), TS 36.201, V9.0.0, "3$^{rd}$ Generation Partnership Project; Technical Specification Group Radio Access Network; Evolved Universal Terrestrial Radio Access Network (E-UTRA); LTE physical layer—General description (Release 9)", Dec. 2009, 13 pages.

3$^{rd}$ Generation Partnership Project (3GPP), TS 36.300, V9.0.0, "3$^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 9)", Jun. 2009.

3$^{rd}$ Generation Partnership Project (3GPP), TS 21.905, V10.2.0, "3$^{rd}$ Generation Partnership Project; Technical Specification Group Services and System Aspects; Vocabulary for 3GPP Specifications (Release 10)", Mar. 2010, 57 pages.

3$^{rd}$ Generation Partnership Project (3GPP), TS 23.891, V9.0.0, "3$^{rd}$ Generation Partnership Project; Technical Specification Group Services and System Aspects; Evaluation of LCS Control Plane Solutions for EPS (Release 9)", Mar. 2009, 64 pages.

3$^{rd}$ Generation Partnership Project (3GPP), TS 36.211, V9.1.0, "3$^{rd}$ Generation Partnership Project; Technical Specification Group Radio Access Network; Evolved Universal Terrestrial Radio Access Network (E-UTRA); Physical channels and modulation (Release 9)", Mar. 2010, 85 pages.

3$^{rd}$ Generation Partnership Project (3GPP), TS 36.213, V9.2.0, "3$^{rd}$ Generation Partnership Project; Technical Specification Group Radio Access Network; Evolved Universal Terrestrial Radio Access Network (E-UTRA); Physical layer procedures (Release 9)", Jun. 2010, 80 pages.

3$^{rd}$ Generation Partnership Project (3GPP), TS 36.302, V9.2.0, "3$^{rd}$ Generation Partnership Project; Technical Specification Group Radio Access Network; Evolved Universal Terrestrial Radio Access Network (E-UTRA); Services provided by the physical layer (Release 9)", Jun. 2010, 18 pages.

3$^{rd}$ Generation Partnership Project (3GPP), TS 36.305, V9.2.0, "3$^{rd}$ Generation Partnership Project; Technical Specification Group Radio Access Network; Evolved Universal Terrestrial Radio Access Network (E-UTRAN); Stage 2 functional specification of User Equipment (UE) positioning E-UTRAN (Release 9)", Mar. 2010, 52 pages.

3$^{rd}$ Generation Partnership Project (3GPP), TS 36.321, V9.3.0, "3$^{rd}$ Generation Partnership Project; Technical Specification Group Radio Access Network; Evolved Universal Terrestrial Radio Access Network (E-UTRA); Medium Access Control (MAC) protocol specification (Release 9)", Jun. 2010, 48 pages.

3$^{rd}$ Generation Partnership Project (3GPP), TS 36.355, V9.2.1, "3$^{rd}$ Generation Partnership Project; Technical Specification Group Radio Access Network; Evolved Universal Terrestrial Radio Access Network (E-UTRA); LTE Positioning Protocol (LPP) (Release 9)", Jun. 2010, 112 pages.

3$^{rd}$ Generation Partnership Project (3GPP), TS 36.410, V9.1.0, "3$^{rd}$ Generation Partnership Project; Technical Specification Group Radio Access Network; Evolved Universal Terrestrial Radio Access Network (E-UTRAN); S1 layer 1 general aspects and principles (Release 9)", Jun. 2010, 15 pages.

3$^{rd}$ Generation Partnership Project (3GPP), TS 36.420, V9.0.0, "3$^{rd}$ Generation Partnership Project; Technical Specification Group Radio Access Network; Evolved Universal Terrestrial Radio Access Network (E-UTRAN); X2 layer 1 general aspects and principles (Release 9)", Dec. 2009, 12 pages.

3$^{rd}$ Generation Partnership Project (3GPP), TS 36.455, V9.2.0, "3$^{rd}$ Generation Partnership Project; Technical Specification Group Radio Access Network; Evolved Universal Terrestrial Radio Access Network (E-UTRA); LTE Positioning Protocol A (LPPa) (Release 9)", Jun. 2010, 52 pages.

\* cited by examiner

NETWORK-BASED LOCATION OF MOBILE TRANSMITTERS

CROSS REFERENCE

This application is a continuation of U.S. application Ser. No. 12/842,861, filed Jul. 23, 2010, currently pending, which is hereby incorporated by reference in its entirety.

TECHNICAL FIELD

The present invention relates generally to methods and apparatus for locating wireless devices, also called mobile stations (MS), such as those used in digital cellular systems, personal communications systems (PCS), enhanced specialized mobile radios (ESMRs), and other types of wireless communications systems. Still more particularly, the present invention relates to methods and apparatus for improving the sensitivity of network-based wireless location system (WLS) receivers to narrowband transmissions and for improving the resolution of WLS receivers to wideband transmissions.

BACKGROUND

A network-based or infrastructure based wireless location system location performance is normally expressed as one or more circular error probabilities. Network-based systems rely on the reception of the wireless device originated uplink mobile transmission which is used in a time (time-of-arrival (TOA), time-difference-of-arrival (TDOA)), power (power-of-arrival (POA), power-difference-of-arrival (PDOA)) or angle-of-arrival (AoA) location calculation. Network-based location calculations can be combined with mobile-based measurements, collateral information, or with other network-based location calculations to form hybrid locations.

Early work relating to network-based Wireless Location Systems is described in U.S. Pat. No. 4,728,959; "Direction Finding Localization System" (issued Mar. 1, 1998) which discloses a system for locating cellular telephones using angle of arrival (AOA) techniques and U.S. Pat. No. 5,327,144, (Issued Jul. 5, 1994) "Cellular Telephone Location System," which discloses a system for locating cellular telephones using time difference of arrival (TDOA) techniques. Further enhancements of the system disclosed in the '144 patent are disclosed in U.S. Pat. No. 5,608,410, (Issued Mar. 4, 1997), "System for Locating a Source of Bursty Transmissions". Location estimation techniques for wide-band wireless communications systems were further developed in U.S. Pat. No. 6,047,192 (Issued Apr. 4, 200), "Robust, Efficient Localization System".

All of these patents are assigned to TruePosition, Inc., the assignee of the present invention. TruePosition has continued to develop significant enhancements to the original inventive concepts. First commercially deployed in 1998 by TruePosition in Houston Tex., overlay network-based wireless location systems have been widely deployed in support of location-based services including emergency services location. As realized and noted in extensive prior art, the ability to routinely, reliably, and rapidly locate cellular wireless communications devices has the potential to provide significant public benefit in public safety and convenience and in commercial productivity.

Modification of the radio signaling in a wireless communications system to enhance the performance of a network-based wireless location system (WLS) has previously been contemplated in TruePosition U.S. Pat. No. 7,689,240; "Transmit-power control for wireless mobile services", U.S. Pat. No. 6,519,465; "Modified transmission method for improving accuracy for E-911 calls", U.S. Pat. No. 6,463,290; "Mobile-assisted network based techniques for improving accuracy of wireless location system", U.S. Pat. No. 6,334,059; "Modified transmission method for improving accuracy for e-911 calls" and U.S. Pat. No. 6,115,599; "Directed retry method for use in a wireless location system".

The use of collateral information to enhance and enable location determination in further applications of network-based systems was introduced in Maloney, et al., U.S. Pat. No. 5,959,580; and further extended in Maloney, et al., U.S. Pat. Nos. 6,108,555 and 6,119,013. These and related following descriptions of the prior art for network-based location determination systems enable robust and effective location-determination performance when adequate measurement data can be derived or are otherwise available.

The Long-Term Evolution (LTE and LTE-advanced) successors to the Universal Mobile Telephone System (UMTS) are based on the Orthogonal frequency-division multiplexing (OFDM) scheme.

The LTE specification (primarily the $3^{rd}$ Generation Partnership Program (3GPP) Technical Specification no. 36.305, "Evolved Universal Terrestrial Radio Access Network (E-UTRAN); Stage 2 functional specification of User Equipment (UE) positioning in E-UTRAN) describes several location techniques for LTE wireless devices (User Equipment or UE). As the standardized location functionality provides a means to determine the geographic position and/or velocity of the User Equipment (UE) based on measuring radio signals. The LTE standardized techniques include:

- network-assisted GNSS (Global Navigation Satellites Systems)
- downlink positioning
- enhanced cell ID method.

Hybrid positioning using multiple methods from the standardized positioning methods is also supported in the LTE technical standards.

SUMMARY

The LTE radio signal allocation, both in time and in bandwidth, to the individual UE is adjustable and modifiable to support a variety of radio environments and mobile services. Tailored uplink transmission parameters can be used both to increase the accuracy of an uplink network-based wireless location system and to decrease the latency in developing a location, while limiting the impact on the LTE wireless communication network.

As explained in greater detail below, in an LTE environment, controllable factors for improving the location performance of a TDOA location system include bandwidth, integration time and signal strength, whereas controllable factors for improving location performance of an AOA system are antenna size, integration time and signal strength. A first inventive method for increasing TDOA performance allows LMU receivers to integrate TDOA and/or AOA measurements over longer periods of time, and thus achieve higher sensitivity. This method employs the Semi-Persistent-Scheduling (SPS) feature of the LTE communications system. A second inventive method for increasing TDOA performance allows LMUs to collect signals over a broader bandwidth, and thus achieve higher resolution. This method uses the Sounding Reference Signal (SRS) feature of the LTE system. Using both the SPS and SRS functions for U-TDOA locations provides the benefit of increased sensitivity and greater resolution, thereby providing the potential for significantly improved location performance. In addition, the present invention provides for a two-stage correlation process made possible by the use of the long-duration narrowband signal and the wideband signal.

Moreover, as described below, in addition to the use of SPS, the useful duration of the nominal, narrowband signal in LTE can be increased by multiple means, including the use of a predetermined UE transmission pattern (for example, hopping pattern) shared by the eNB and eSMLC; real time sharing of the commanded, dynamic UE transmission allocation between the LMU and eNodeB; and the use of a commanded UE transmission allocation as received by a downlink monitor.

Finally, post-processing of signals received and stored by the serving LMU and proximate LMUs provides for further improved performance. Use of a historical UE transmission allocation received at the eSMLC from the serving eNB or from a downlink monitor can accelerate this processing. Other aspects of the present invention are described below.

BRIEF DESCRIPTION OF THE DRAWINGS

The foregoing summary as well as the following detailed description are better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 10$b$ depicts the second stage of a two-stage correlation process made possible by the use of a comparatively narrowband signal and the 3GPP-defined Sounding Reference Signal (SRS) function to enable a network-based location.

DETAILED DESCRIPTION OF ILLUSTRATIVE EMBODIMENTS

We will now describe illustrative embodiments of the present invention. First, we provide a detailed overview of the problem and then a more detailed description of our solutions.

A goal of the present invention is to provide methods and systems to enable the use of network-based techniques (U-TDOA, AOA, POA, etc.) to achieve improved performance in locating mobile transmitters operating in an LTE environment. Obtaining uplink TDOA measurements in 3GPP-defined Orthogonal-frequency-division-multiplexing (OFDM) based Long Term Evolution (LTE) network is a significant challenge compared to other radio air interfaces (GSM, CDMA, CDMA-2000 or UMTS).

The LTE network (also called an evolved Universal Mobile Telephony Radio Access Network (eUTRAN) or Evolved Universal Terrestrial Radio Access (E-UTRA)) can be used in both paired spectrum for Frequency Division Duplex (FDD) mode and unpaired spectrum for Time Division Duplex (TDD) mode allowing coexistence in the same network. The LTE system, designed to support packet-based communications, relies on dynamic scheduling of physical resources (in both the frequency and time domains) in order to achieve high user data rates. Both the downlink (eNodeB-to-UE) and, via grants, uplink (UE-to-eNodeB) radio resources are under the control of the eNodeB (eNB).

For a wireless location system to achieve high performance when operating in an LTE environment, it would be highly advantageous to provide ways to improve the sensitivity and/or resolution of the receivers employed to receive the uplink and downlink transmissions.

Figure 1:
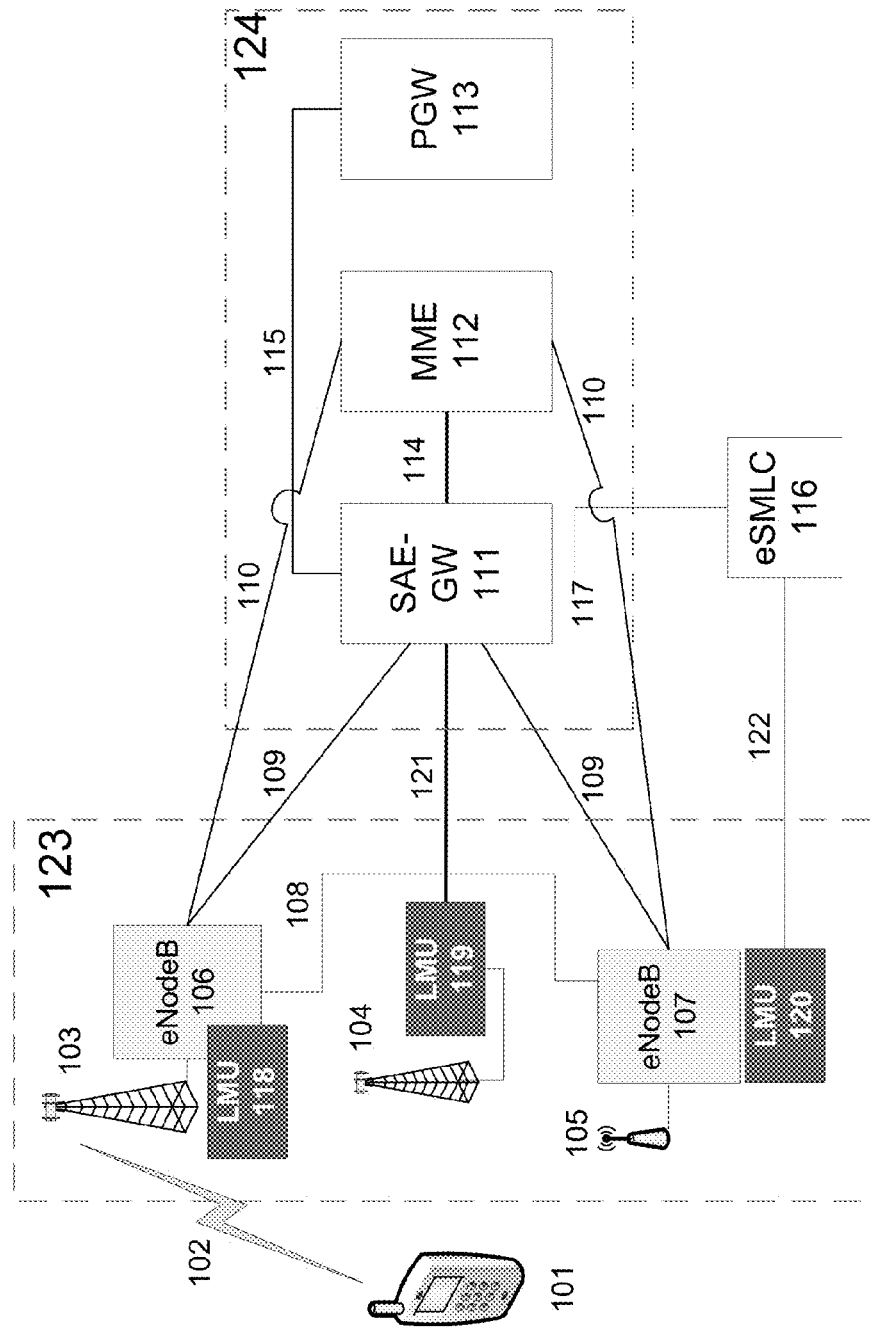
FIG. 1 schematically depicts an example eUTRAN/LTE wireless communications network with a network-based wireless location system.

FIG. 1 shows an example of a 4$^{th}$ generation Long Term Evolution (LTE) wireless communications network. Included in this example network is a 3GPP defined eUTRAN radio access network 123 and Evolved Packet Core (EPC) 124. Also included are the network-based Location Measurement Units (LMUs) 118 119 120 and the evolved Serving Mobile Location Center (eSMLC) 116. Please note that the distinct LMU 118 119 120 and eSMLC 116 can be both or either physical and functional, for instance the example standalone LMU 119 unit with its own antenna and amplifier equipment, the co-located LMU 120 deployed with an eNodeB to take advantage of the attendant antenna, backhaul, and electrical and environmental facilities, and the integrated LMU 118 which is a functional entity residing in the eNB circuitry and software. As shown in FIG. 1, multiple types of LMU instantiations may exist in the same network.

In an LTE radio air interface network 123, the mobile device, a user equipment or UE, 101 communicates over the LTE air interface 102 to the serving eNB 106 via the deployed antenna array 103. The LTE air interface 102 has an OFDM-based downlink and SC-FDMA-based uplink. The eUTRAN network 123 consists of antenna arrays 103 105 serving attendant eNodeBs 106 107 with associated internode communications; the X2 interface 108 and S1-U backhaul 109, the S1-MME interface 110.

The System Architecture Evolution Gateway (SAE-GW) 111, also referred to as the Serving Gateway (S-GW), is a primarily packet routing entity with bridging abilities to other LTE and non-LTE networks. In this example it also forwards the packet traffic from the LMUs 118 119 deployed in its service area to the eSMLC 116. Packet Data between the eSMLC 116 and an LMU 120 may be a distinct digital connection 112 not routed by the SAE-GW 111. In practice, the SAE-GW 111 may be combined on the same platform as the Mobility Management Entity (MME) 112 for small systems, but generally the SAE-GW 111 will be a separate, scalable subsystem with a many-to-1 relationship with the MME 112.

The MME 112 is the central controller for the LTE network. The MME 112 handles inter-system functions as well as authentication control, admission control, roaming control and selection of SAE-GW 111 for the UE.

The Public Data Network Gateway (PGW) 113 is the firewall and connection point between the LTE network and external data networks. As the firewall, the PGW 113 enables operator policy enforcement, packet screening and filtering for each UE, charging support, and Lawful Intercept.

As the connection point, the PGW 113 acts as the entry and exit point for data traffic between the UE 101 and external packet data networks (not shown). The SAE-GW 111 is connected to the MME(s) 112 via the standardized S11 interface 114. The SAE-GW 111 is connected to the PGW 113 via the standardized S5 interface 115. The eSMLC 116 is connected to MME 117 and the LPPa interface 117. A connection (not shown) between the SAE-GW 111 and the eSMLC 116 has been proposed to facilitate the transfer of information from LMUs 118 119 that use not-yet standardized messaging present in the eNB 118 backhaul or not-yet standardized messaging from standalone LMUs 119 using a specialized backhaul 121.

Figure 2:
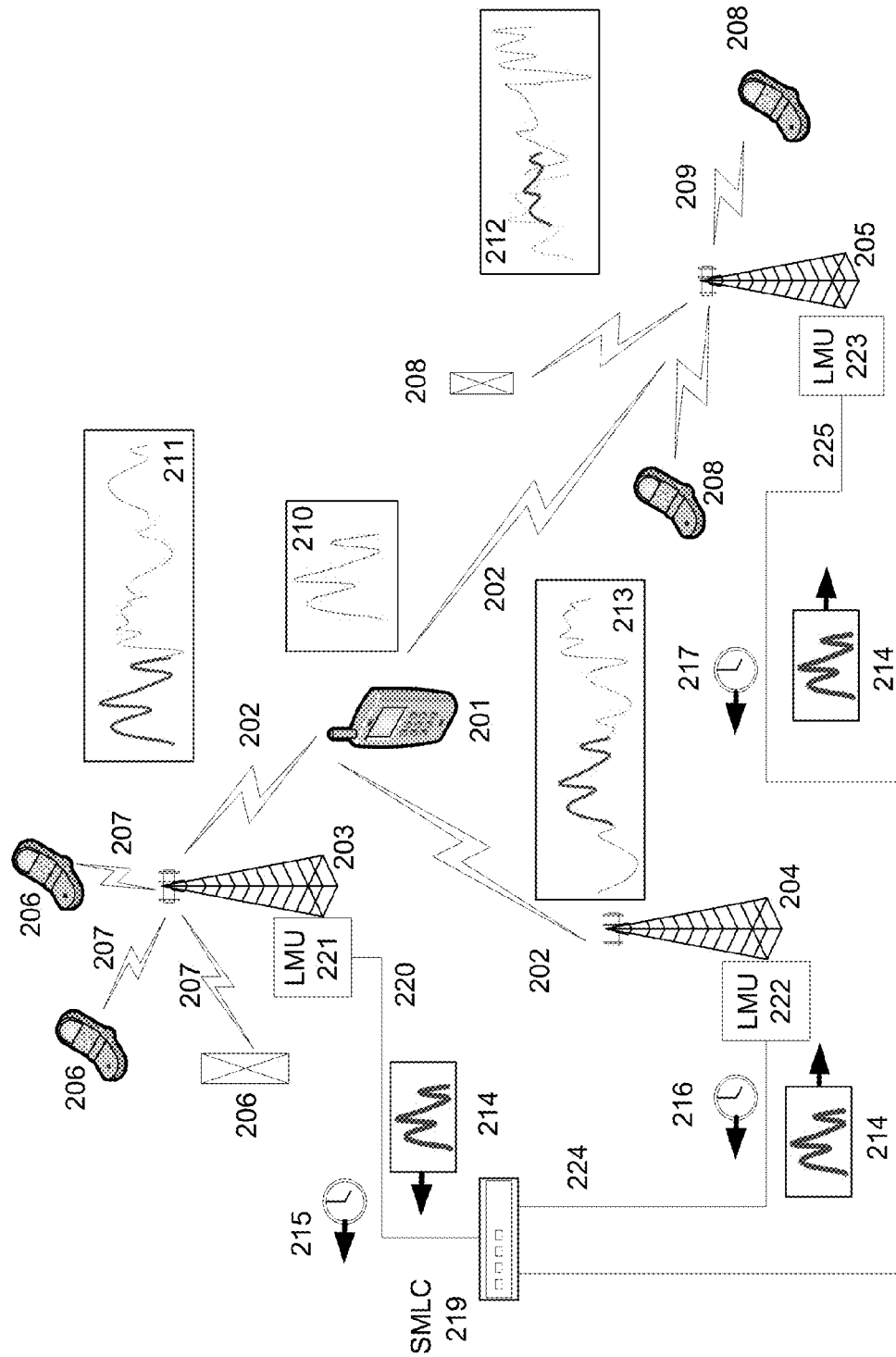
FIG. 2 shows the sequence of events in calculation of a UE position by a network-based Wireless Location System

In the example network, the eSMLC 116 is shown as a standalone node, while some LMUs 118 120 are integrated into or co-located with the eNodeBs and reuse antenna and backhaul communications resources. A standalone LMU 119 is also shown with dedicated backhaul 121 and dedicated antenna array(s) 104. Besides the LMU 118 119 120 and eSMLC 116 nodes, and the modified backhaul 109 110, the specialized backhaul 121 and the separate backhaul 122; 3GPP technical specifications can be found for all other nodes and interfaces In FIG. 2, the components and operations of a network-based Wireless Location System are shown. The WLS is composed of the SMLC 219 and the geographically distributed LMUs 221 222 223. The described WLS architecture supports uplink Time-Difference-Of-Arrival (U-TDOA), uplink Power-difference-of-arrival (PDOA) and uplink Angle-of-Arrival (AoA) location techniques. This is example WLS, the LMU's 221 222 223 are co-located with eNodeBs 203 204 205.

When the WLS is tasked either by the associated LTE wireless communications system or a triggering platform (both not shown), the eSMLC 219 determines the LMU best suited to detect the received signal and serve as the reference LMU. The eSMLC 219 also determines which sites are good candidates for making UTDOA and/or AoA measurements and the LMUs at these site 204 205 can act as cooperating LMUs. Details of triggering platforms, both control-plane and user plane based, can be found in TruePosition U.S. Pat. No. 7,167,713 "Monitoring of call information in a wireless location system", U.S. Pat. No. 6,782,264; "Monitoring of call information in a wireless location system", U.S. patent application Ser. No. 11/150,414; "Advanced triggers for location-based service applications in a wireless location system", and U.S. patent application Ser. No.11/533,310; "USER PLANE UPLINK TIME DIFFERENCE OF ARRIVAL (U-TDOA)".

While the UE of interest 201 is on channel and transmitting 202, the SMLC 219 instructs the reference site 203 LMU and cooperating sites 204 205 LMUs to collect the transmitted signal of interest 210 at synchronized times. At each LMU 203 204 205, interference and corruption of the signal of transmitted signal of interest 210 from other UE transmissions 207 208 is expected.

The SMLC also instructs the reference LMU at the serving site 203 to detect the received signal 211. The cooperating site 204 205 LMUs at simply collect the baseband signals 212 213 and wait. Next, the reference LMU at the serving site 203 extracts the reference signal 214 in an environment with relatively small levels of interference present at the serving cell. Once the reference signal 214 is collected, the reference LMU 221 sends the reference signal 214 and time of arrival 215 to the SMLC 219 over the digital data backhaul 220 which then forwards the reference data 214 along to the cooperating LMUs 222 223 over the digital wired or wireless backhaul 224 225.

The cross-correlation with the reference signal 214 is then done at the cooperating LMUs 222 223. At the cooperating LMUs 222 223 the received signal 212 213 is weak with potentially high levels of interference. Long integration lengths (relative to a symbol period) give the cooperating LMUs 222 223 additional processing gain. The long integration lengths arise from using reference data that come from the entire normal transmission of data from the UE rather than only using a special predetermined signal for positioning. The long integration lengths help the cooperating LMUs 222 223 extract a reliable UTDOA estimate from the weak signal with relatively high levels of interference 212 213. Lastly, the co-operating LMUs 222 223 send the UTDOA measurements 216 217 to the SMLC 219 where the final mobile position is determined and sent back to the core network (not shown).

For the TDOA location technique, which includes the U-TDOA network, the Cramer-Rao Lower Bound represents the minimum achievable variation in TDOA measurement and thus the ultimate achievable precision of the U-TDOA system (where multiple, geographically distributed receivers locate on the same radio transmission). The accuracy of any individual location will vary with radio conditions unique to that location, including the multi-path environment and geometric dilution of precision from the geometry of the mobile device in respect to the receivers.

Theoretically, the precision of a TDOA technology is limited by several practical factors such as integration time, signal-to-noise ratio (SNR) at each receiver site, as well as the bandwidth of the transmitted signal. The Cramer-Rao bound illustrates this dependence. The bound can be approximated for any pair of receivers (TDOA requires a minimum of three receivers) as:

$$TDOA_{CRLB} = \frac{1}{(1.5)^{1/2}\pi B^{3/2} T^{1/2} SNR^{1/2}}$$

where B is the bandwidth of the signal, T is the integration time and SNR is the smaller SNR of the two sites.

The Cramer-Rao Lower Bound can also be determined for the Angle-of-Arrival (AoA) location technique. Theoretically, it is expressed as:

$$AoA_{CRLB} = \frac{6}{m^3 (T) SNR}$$

where m is a quantity proportional to the size of the AoA array in wavelengths, T is the integration time and SNR is the signal-to-noise ratio.

From the theoretical analysis, controllable factors for improving the location performance of a TDOA system are Bandwidth, integration time and signal strength while controllable factors for improving the location performance of an AoA system are antenna size, integration time and signal strength.

Time

The LTE user equipment (UE) is told by the serving eNB every subframe (1 ms) what frequency and what modulation scheme to use for uplink transmission. Accurate Uplink TDOA measurements require long integration period during which the phone transmits on known frequency resources and modulation scheme. The eNB is able to allocate uplink transmission interval (TTI) resources to individual UE. The TTI is a 1 millisecond subframe which includes two 0.5 millisecond slots. The eNB can assign times down to the individual slot.

Bandwidth

The LTE physical layer is built on OFDM technology which uses multiple carriers over a wide frequency bandwidth. OFDM allows both the eNB and UE receivers to resolve multi-path and delay spread. The OFDM variant selected for uplink is Single Carrier Frequency-division multiple access (SC-FDMA). SC-FDMA in LTE uses multiple, contiguously adjacent 15 kilohertz (kHz) subcarriers ( ). The eNB is able to allocate uplink bandwidth to individual UE. The bandwidth is based on the number of allocated subcarriers and at least 12 subcarriers for 180 kHz. This is the minimum BW that eNB can allocate. It may be more in many other cases. The eNB grants uplink time and frequency allocations for each UE by assigning resource blocks (RB). A RB is nominally 12 subcarriers for 0.5 milliseconds.

To achieve high location accuracy, the LMU has to be able to resolve multi-path and provide TDOA measurements with low RMS error in the LTE multi-path environment.

Signal Strength

The LTE system is designed to use multiple antennas to boost the SNR. The techniques of Multiple-Input-Single-Output (MISO) and Multiple-Input-Multiple-Output (MIMO) are used to capture several spatial paths on the radio air interface between the LTE network and the mobile device; so these paths can carry time-delayed and frequency delayed copies of the same streams of information, allowing an increase performance (due to higher Signal to Noise Ratio (SNR) at the receiver).

TruePosition's LMU technology has long used the Multiple-Input-Single-Output (MISO) technique to raise the accuracy of its U-TDOA and AoA technologies. The LMU can use the additional antenna deployed for the eNB for its own receivers. Other techniques to increase the SNR include coordinated UE transmission power-up where the eNB orders a power increase for the UE after informing the LMU.

Method 1—Increasing the Time

A first method for increasing TDOA performance that will allow LMUs to integrate TDOA and or AOA measurements over longer period of time (and achieve higher sensitivity) is to use the Semi-Persistent-Scheduling (SPS). SPS is a 3GPP LTE defined technique (3GPP TS 36.321 and TS 36.331) to support applications such as voice and video that require near real-time service of low-rate data packetized streams. With SPS a reduction in downlink signaling messaging in LTE for guaranteed bit rate services is achieved. The SPS feature allows eNB to command the UE only once what are the uplink/downlink resources (frequency and modulation scheme) to be used for LTE transmission. The UE is also told at what periodicity to use these resources. Once SPS activated, the UE will be transmitting on known physical resources until told otherwise.

The network-based WLS with its geographically distributed network of receivers can use the SPS function to enhance the sensitivity of the receivers to the transmitted signal. Enabling SPS feature during UTDOA and/or AoA locations, will allow LMUs to collect radio data on the known physical resources over longer periods of time than permitted by the dynamic scheduling system. Use of the SPS also allows efficient scheduling of uplink receiver resources (the LMU) while increasing the signal collection time.

Figure 4:
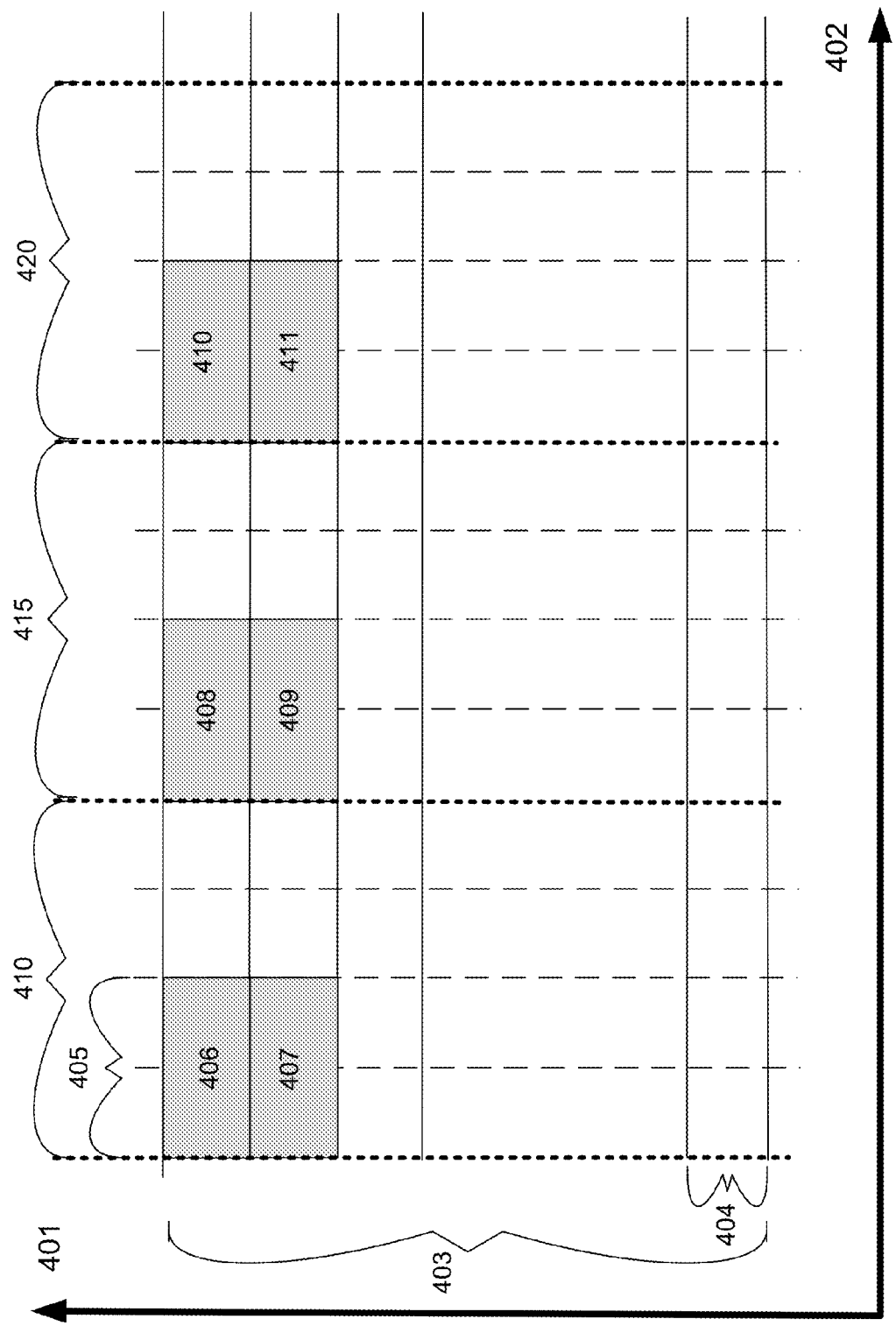
FIG. 4 shows a time-frequency map of the uplink signaling between an LTE UE and an eNodeB using the Semi-persistent Scheduling (SPS) function.

FIG. 4 illustrates an example of the SPS function being used to increase the signal integration time. FIG. 4 is a time 402 and frequency map 401 of the spectrum available to a UE under control of an eNode B. The bandwidth 403 in this example is a divided into sets of subcarriers grouped by 12's into 180 kHz bands 404. Each band is divided in time into 0.5 millisecond slots and the slots are grouped into a 1.0 millisecond subframe. The 12 subcarriers bandwidth and single subframe (two 0.5 ms timeslots) are each 1 resource block (RB).

The eNodeB uses the SPS function to set a known pattern of resource blocks for the UE of interest. In the first cycle, the UE is allowed to transmit using 2 RB 406 407 while all other RB are reserved for other users. When certain UE needs more than 1 RB, eNB will allocate N contiguous RB's in frequency domain.

The eNodeB can optimize the SPS pattern by distributing the RB pattern over the available spectral bandwidth 403 via frequency hopping or spreading of the selected carriers, thus allowing bandwidth synthesis to be used (see TruePosition's U.S. patent Ser. No. 6,091,362; "Bandwidth synthesis for wireless location system" for additional detail on using bandwidth synthesis) to further improve TDOA location accuracy. The RB allocation in time is always for 1 ms. Frequency hopping is per time slot (0.5 ms). In this case the resources allocated for 1 ms can be hopped in the middle. The eSMLC will be informed of the hopping sequence.

In this example, the SPS two RB allocation pattern is repeated for 3 cycles. In the second cycle 415, the time and frequency allocation of the allocated resource blocks 410 411 is repeated. In the third cycle 420, the time and frequency allocation of the allocated resource blocks 414 415 is repeated, same as the first two cycles.

Method 2—Increasing the Bandwidth

A second method for increasing TDOA performance will allow LMUs to collect signals over a broader bandwidth. This method yields an improvement in usable bandwidth over the bandwidth synthesis technique available using only the SPS function. We talked about 1RB because that will be worst case from accuracy performance. If there are more RB's allocated on uplink, we can use them.

LTE has a standardized (in 3GPP TS 36.213 and TS 36.211) function called the Sounding Reference Signal (SRS). The eNB typically instructs UE to transmit SRS signal in order to optimize frequency resource scheduling. The UE's broadband SRS transmission (nominally from 720 KHz up to 10 MHz wide) is used to provide to the eNB sufficient radio air interface information allowing modeling of the frequency domain response of the uplink channel as to help optimize frequency resource scheduling.

The network-based WLS with its geographically distributed network of receivers can use the SRS to enhance the time resolution of the received signal.

For an uplink TDOA-based wireless location system, the increased bandwidth of the SRS can be used to enhance the performance of the TDOA location. If eNB could instruct UE to transmit the SRS signal during UTDOA locations, the LMU's will be able to collect RF data over wider bandwidth and calculate more accurate TDOA measurements in multipath environment. The location-enhancing SRS may be constrained both in bandwidth and periodicity based on knowledge of the local radio propagation environment or results of prior SRS bursts.

Figure 5:
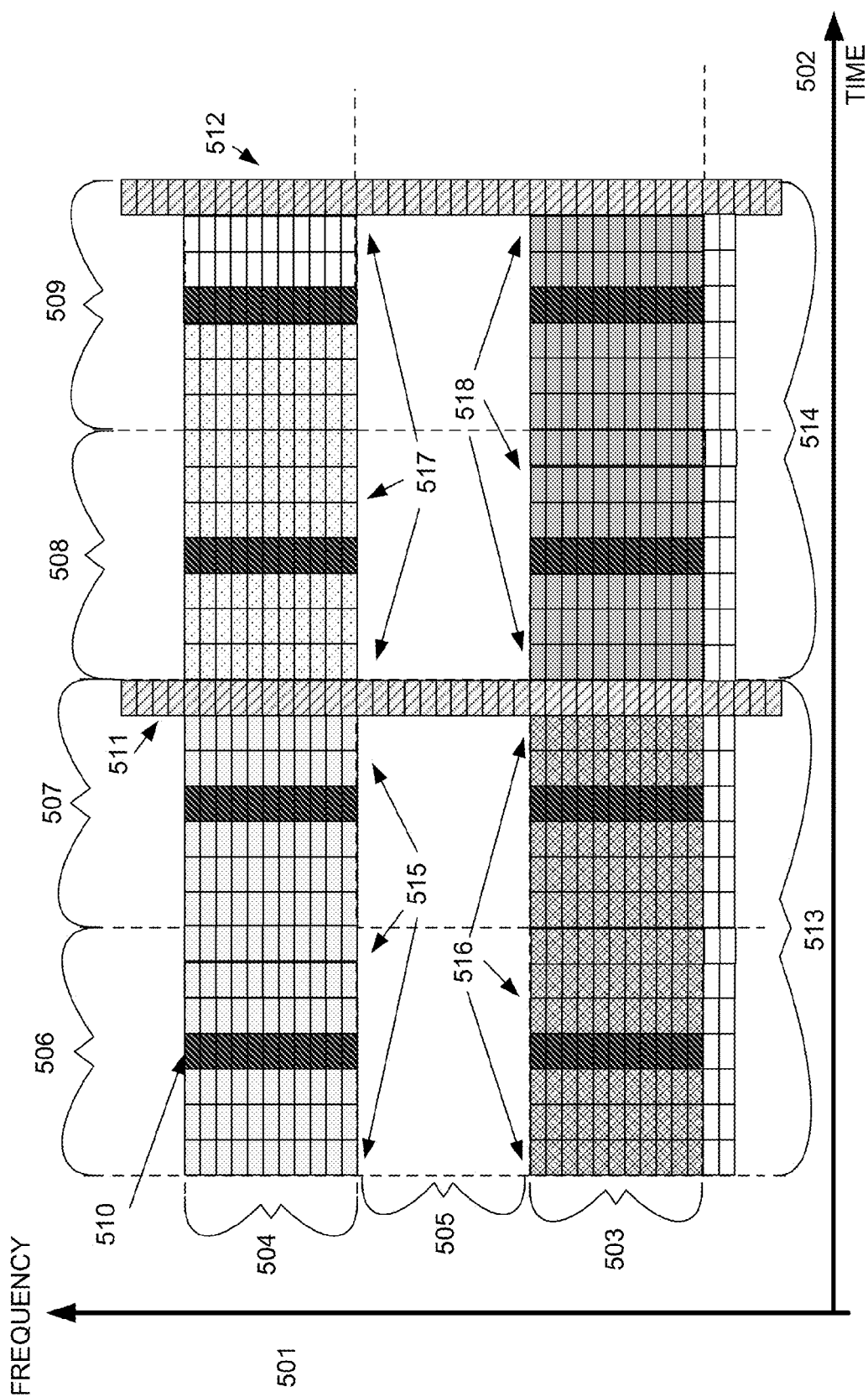
FIG. 5 shows a time-frequency map of the uplink signaling between an LTE UE and an eNodeB using the Sounding Reference Signal (SRS) function.

In FIG. 5 a time 502 and frequency 501 map is shown to illustrate the SRS functionality in improving the available bandwidth. In LTE there are two types of cyclic prefix defined that help prevent ISI between OFSM symbols. The first type, the normal case, (shown in this illustration) is 7 OFDM symbols in 0.5 milliseconds (ms) while the second type, known as the special type, uses 6 OFDM symbols in 0.5 ms period, allowing longer cyclic prefixes.

Only a representative portion of the spectral bandwidth available to the serving eNodeB is shown in FIG. 5. Two SC-FDMA "channels" 503 504 each consisting of adjacent 12 kilohertz subcarriers are shown. The frequency gap between channels 505 shown here is only for the purpose of brevity and could be filled with additional channels allocated to the serving eNodeB.

Only four 0.5 millisecond slots 506 507 508 509 are shown in this brief example and thus only one complete 2 ms subframes 513 514. In practice additional resource blocks would be used, but this abbreviated example is enough to show the implementation of SRS for generation of a broadband signal for wireless location. A total of four distinct resource blocks (RB) 515 514 515 516 are shown in FIG. 5.

In the FIG. 5 example, the eNodeB has set up a two SRS bursts 511 512 and dynamically allocates two 515 518 to the UE of interest in the time period shown. The SRS is allocated semi-static and has periodicity of N. As shown, the SRS 511 512 is always assigned the last OFDM symbol (number 14 in a frame) and hence it is known where it will be when assigned by the eNodeB.

The LMUs involved in this location, would receive both the RB 515 518 associated with the UE of interest and the SRS 511 512 associated with the UE of interest.

Method 3—Increasing the Time and Bandwidth

Using both SPS and SRS signals for UTDOA locations, will allow the benefit of increased sensitivity (longer integration of SPS) and smaller delay spread (wider bandwidth of SRS). Having both SPS and SRS available allows for tailoring of the location-related uplink signaling to the local radio propagation environment or to take advantage of locally-deployed wireless location resources, for instance a TDOA LMU or TDOA/AoA Hybrid LMU can take advantage of both increased transmission time and bandwidth while an AoA LMU would not require the additional bandwidth, but instead may require greater UE transmit power to enhance location accuracy.

Figure 3:
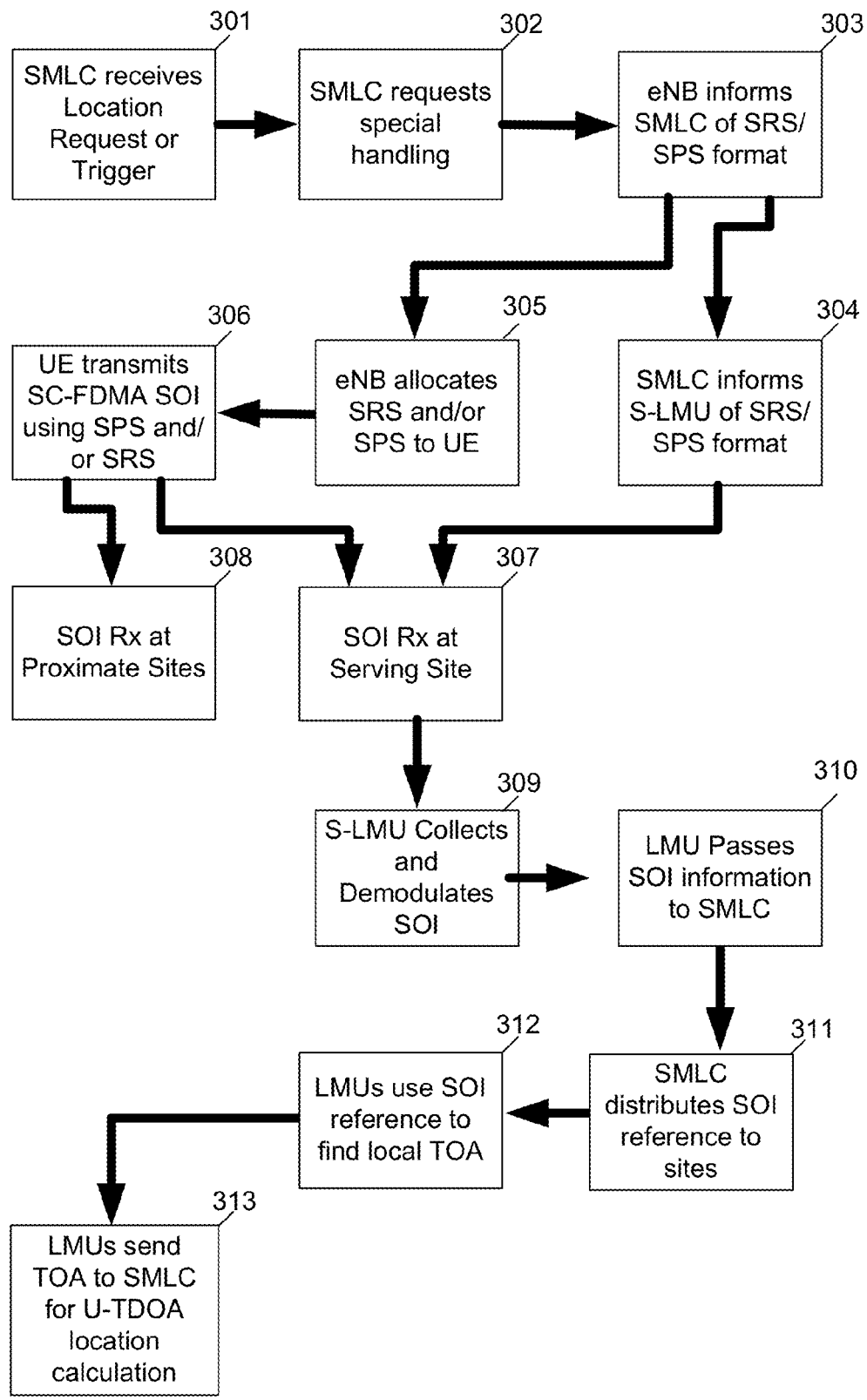
FIG. 3 shows the procedure for a network-based wireless location in an LTE wireless communications network with requested special handling for location of a communications session.

FIG. 3 shows the sequence of events in a network-based wireless location in an LTE wireless communications network. The location procedure for the WLS starts with a triggering event 301, either reception of tasking information from the core network in a defined Location Request Message or from a triggering platform added to the core network (see TruePosition U.S. Pat. No. 6,782,264 B2; "Monitoring of Call Information in a Wireless Location System", U.S. Pat No. 7,167,713; "Monitoring of call information in a wireless location system"; and TruePosition U.S. patent application Ser. No. 11/150,414; "Advanced triggers for location-based service applications in a wireless location system" for additional detail on passive triggering platforms.) The triggering event contains at least serving eNodeB information and a UE identifier.

In the FIG. 3 example, the SMLC requests special handling for the UE of interest 303. This special handling request may go directly to the serving eNB or to the MME which would then command the eNodeB.

To take advantage of the increased integration time afforded by SPS and/or the increased bandwidth available when the UE is transmitting SRS, the SMLC is informed by the eNodeB either directly or via the MME of the any allocation of SPS, SRS, and declared timing 303. The SMLC immediately tasks the local LMUs 304. At the declared time, the UE grants SPS and/or SRS to the UE of interest 305. The UE in response adjusts its uplink signaling 306. The UE signaling is received by the serving LMU 307 and the neighboring LMUs 308 as selected by the SMLC.

The serving LMU collects the UE signaling and demodulates the signal of interest 309. The SOI is then passed to SMLC 310 which then distributes the reference SOI to the selected, co-operating LMUs 311. The co-operating LMUs use the reference to find the local time-of-arrival from the previously received signal using correlation processing in the time and frequency domains. All co-operating LMUs then return the individual times of arrival (and/or angles of arrival for AoA equipped LMUs) to the SMLC for U-TDOA and/or hybrid U-TDOA/AoA based location estimation 313.

Figure 6:
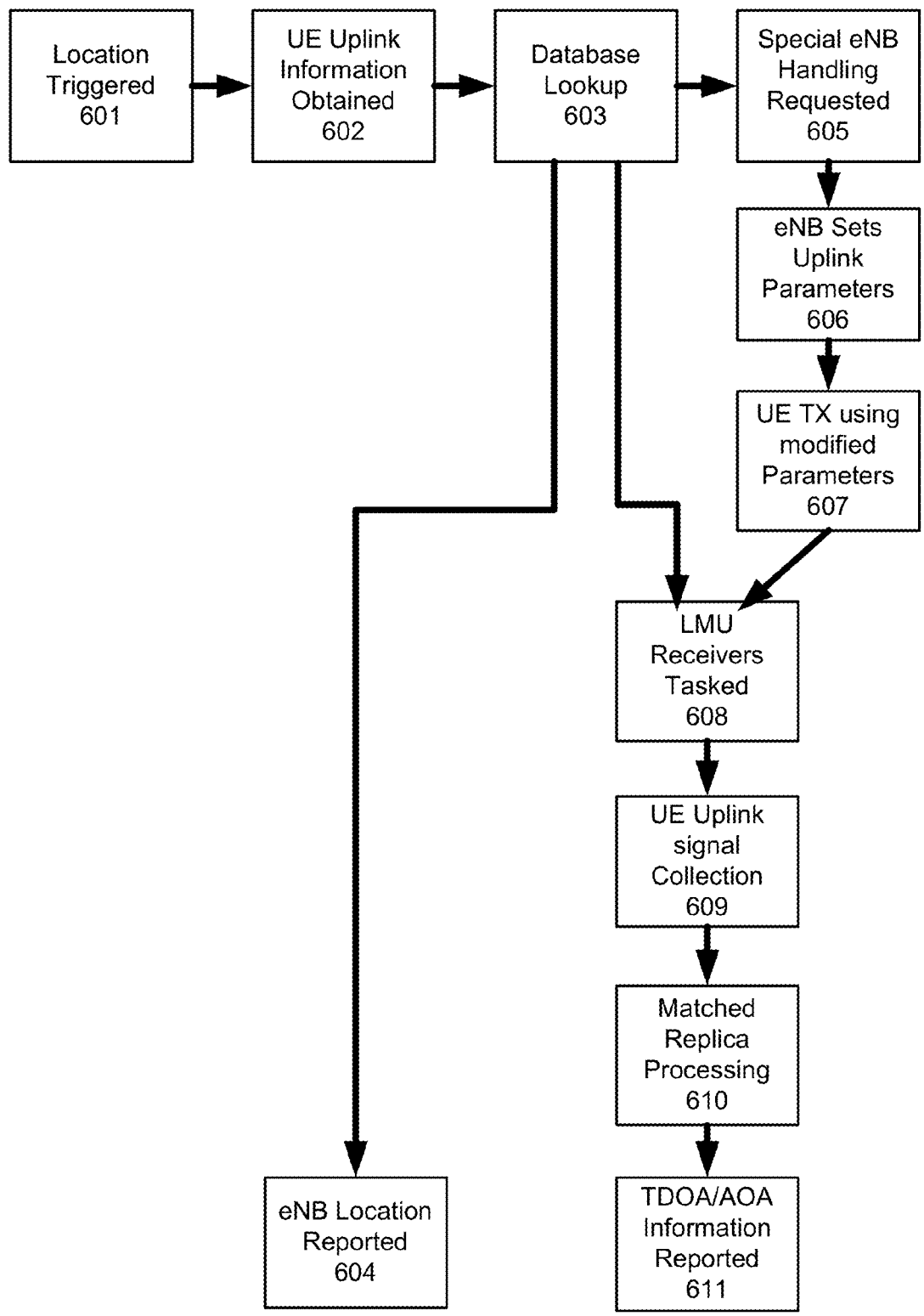
FIG. 6 shows the operational steps in setting a dynamic set of uplink transmission parameters for UE location based on historical data.

In order to dynamically optimize the adjustable parameters that control the available signal collection time, bandwidth and power, the wireless location system (either as part of the eSMLC or as an offline provisioning system) can provide uplink setting configuration data (USCD) to the eNodeB via use of a database. In the FIG. 6 example, a location is triggered 601 and the eSMLC receives the current UE uplink parameter settings 602. Using the current UE uplink parameter settings, uplink signal measurements and the serving cell (and potentially the involved antenna), a database lookup is performed to find the USCD best suited for the location request. Multiple USCD entries may be available depending on the location quality of service or system loading. At this point, the eSMLC database may show that the serving eNodeB is a Femto-cell or that the serving cell, time or power-based ranging sufficiently determines a location to meet the location quality of service. The eNB location (or the computed location based on the eNB location and available range data) is reported as the final location to the triggering entity 604. The triggering entity may be MME or a triggering platform. The MME may be forwarding a location request from some location service associated with a particular target UE from another entity (e.g., GMLC, eNB, or UE) or the MME itself decides to initiate some location service on behalf of a UE of interest.

The USCD is forwarded to the eNB as a part of a request for special handing for the UE of interest 605. This special handling request may be an addition to the current quality-of-service class identifier (QCI) or be a new message. In response to the request, the eNB sets the uplink parameters 606 and the UE then changes its uplink transmission parameters 607.

The eSMLC either blindly or in negotiation with the eNB, tasks the LMU receivers 608 to receive the modified (or unmodified if the eNB so replies) uplink transmissions. If no USCD information is available or the originally obtained UE uplink parameters sufficed, then the eSMLC may not have requested special handling and immediately proceeded to the tasking of LMU receivers 608.

The LMUs perform the signal collection of the UE's uplink signal 609 and correlation processing 610. Using the signal time-difference-of-arrival information (and angle of arrival if available) a final location, location error estimate, velocity and velocity error estimate is calculated and delivered 611. Altitude may also be calculated from the signal time-difference-of-arrival and/or angle-of-arrival information.

Figure 7:
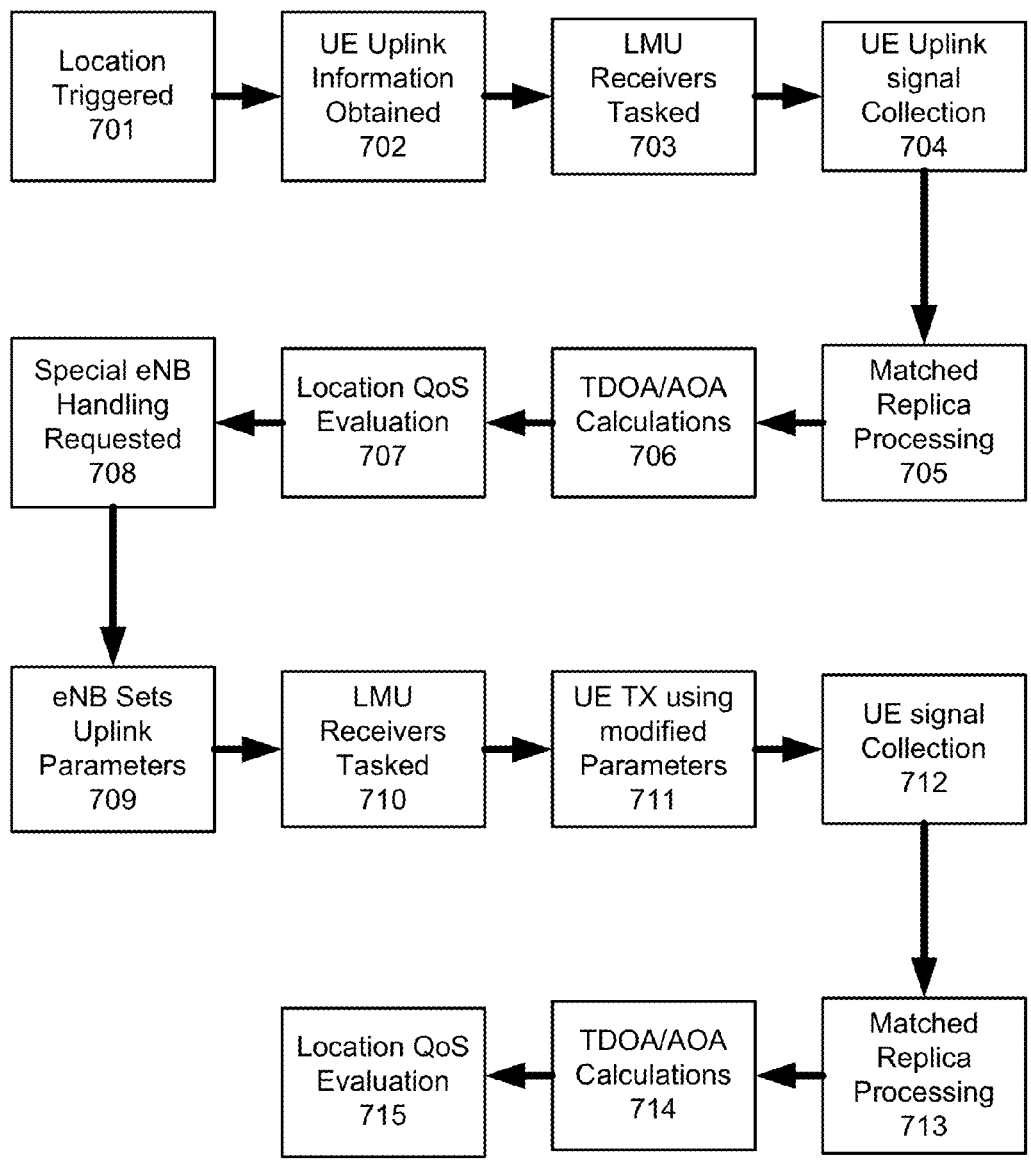
FIG. 7 depicts an example of a multi-pass location procedure where the uplink transmission parameters for UE location are modified.

FIG. 7 shows a multi-pass scenario intended to limit the need for adjustment of UE uplink transmission parameters for location estimation only when necessary. A location is triggered 701 and the eSMLC receives the current UE uplink parameter settings 702. The eSMLC tasks the LMU receivers 703 to receive the UE uplink transmissions.

The LMUs perform the signal collection of the UE's uplink signal 704 and correlation processing 705. Using the signal time-difference-of-arrival information (and angle of arrival if available) a final location, location error estimate, velocity and velocity error estimate is calculated 706. The calculated location is evaluated against the quality of service (QoS) preset for the location, the location type, the location client type, or as delivered in the location triggering message 707. If the QoS is not met (and the added latency is allowable), the eSMLC requests special handling for the UE of interest and uplink setting configuration data (USCD) is forwarded to the eNB. In this example, the eNB sets the uplink signal parameters for the UE of interest 709. The eNB in alternate scenarios may reject the USCD or negotiate with the eSMLC on a modified USCD.

The eSMLC tasks the LMU receivers 710 to receive the modified uplink transmissions from the UE of interest 711. The tasked LMUs perform the signal collection of the UE's uplink signal 712 and correlation processing 713. Using the signal time-difference-of-arrival information (and angle of arrival if available) a final location, location error estimate, velocity and velocity error estimate is calculated 714. The newly developed location estimate may be compared to the previous and to the QoS 715. The highest quality location may then be delivered or the multi-pass operation repeated with another USCD derived from the signal information collected in the first and second location attempts.

Figure 8:
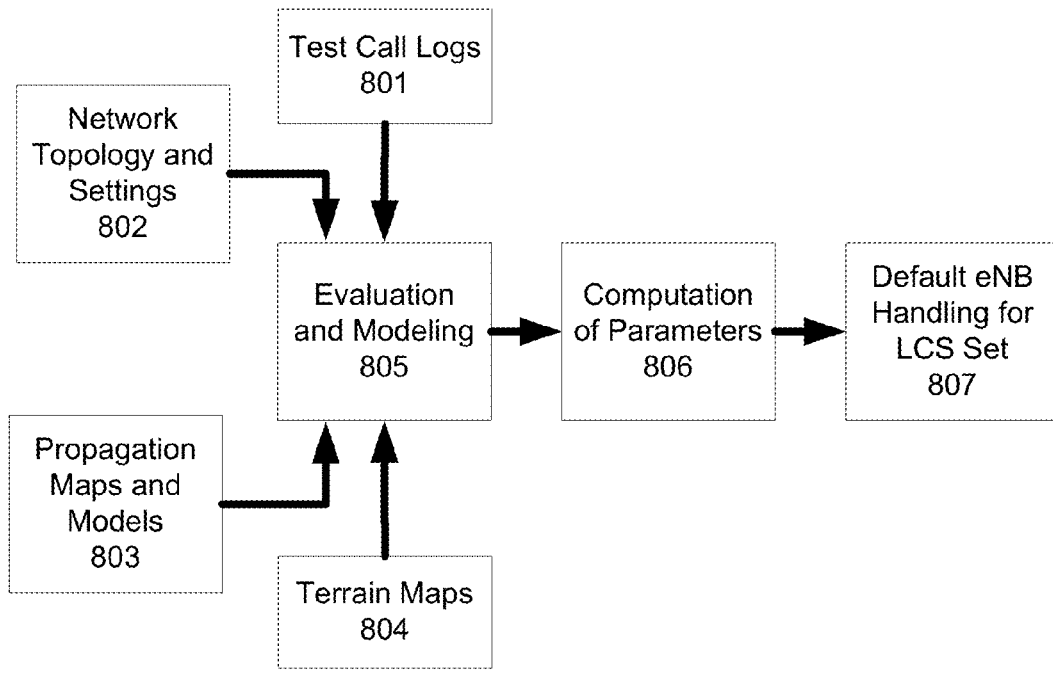
FIG. 8 shows the operational steps in setting a default set of uplink transmission parameters for UE location.

FIG. 8 shows the development of a default setting of UE uplink parameters for location services. The four inputs are wireless location test call logs 801, network topology and network settings 802, and propagation maps and models 803, and terrain and building maps 804. A simulator is used to model the LTE wireless network and allow free adjustment of the UE uplink parameters in the geographic service area as described by a single antenna array, a single eNB, or any arbitrary grouping of eNB. An earlier model for siting of LMU resources was described in TruePosition U.S. patent application Ser. No. 11/948,244; "Automated Configuration of a Wireless Location System" and U.S. application Ser. No. 11/736,902; "Sparsed U-TDOA Wireless Location Networks," both of which hereby incorporated by reference in their entirety.

For each eNB antenna (or antenna array grouping) in the network, an uplink setting configuration data (USCD) package is computed 806. The USCD is available for real-time special handling requests to the eNB or as shown here, uploaded into the eNB as a default setting for location services calls 807.

Figure 9:
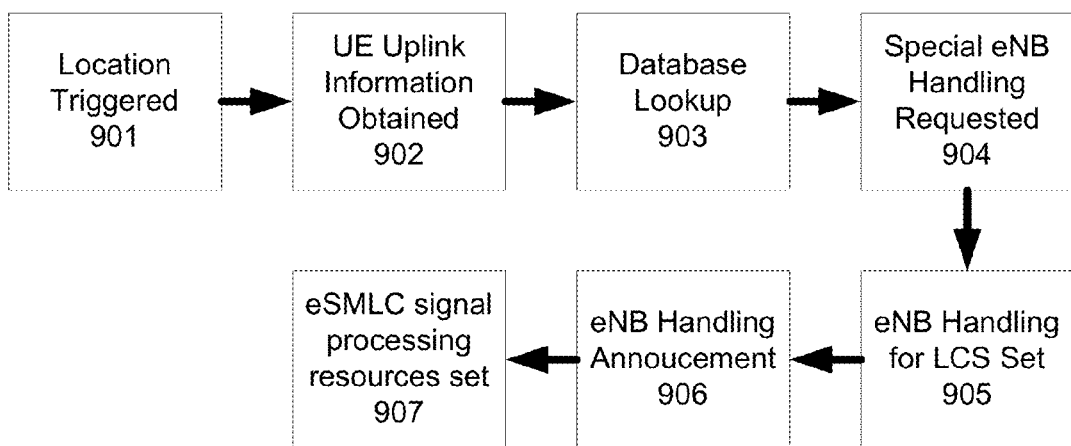
FIG. 9 depicts the operational steps in a request and response in the setting of the uplink transmission parameters for UE location.

One example of the uplink parameter negotiation for location between the eNB and the eSMLC is shown in FIG. 9. In this scenario, the location is triggered 901 and the uplink signal information is obtained 902. After a database lookup for default or previously computed uplink setting configuration data (USCD) 903, the eSMLC request special handling for the UE of interest 904. In this scenario, the eNB sets the uplink parameters 905 and then announces the uplink parameters to the eSMLC 906. The announcement parameters may or may not match the requested set. If the announcement parameters do not match the requested parameters, the eSMLC will in response attempt to mitigate the non-optimal settings 907 by adjustment of LMU collection time, the number of LMUs involved in the location estimate, and/or the allocation of internal LMU signal processing resources.

Figure 10A:
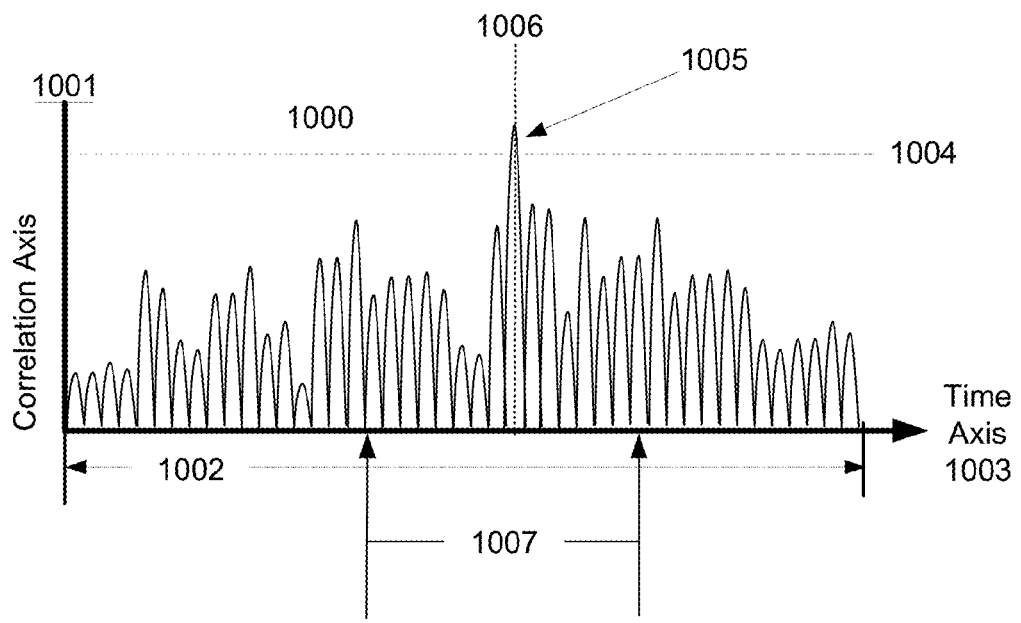
FIG. 10$a$ depicts the first stage of a two-stage correlation process made possible by the use of the long-duration narrowband signal and a wideband signal.

FIG. 10a is a graphical depiction of the first stage of a 2 stage correlation process may possible by the use of the long-duration narrowband signal and a wideband signal.

The nominal, narrowband signal in LTE can use increased in useful duration by multiple means:
  Use of the 3GPP-LTE defined Semi-Persistent-Scheduling (SPS),
  Use of a predetermined UE transmission pattern shared by the ENB and eSMLC,
  Real time sharing of the commanded, dynamic UE transmission allocation between the LMU and eNB (this includes instances where the LMU is a functional entity supported within the eNB circuitry and software),
  Use of an commanded UE transmission allocation as received by a downlink monitor,
  Post-processing of recording signals recorded by the serving LMU and proximate LMUs. Use of a historical UE transmission allocation received at the eSMLC from the serving eNB or from a downlink monitor can accelerate this processing.

Using Semi-Persistent-Scheduling (SPS) as an example of a extended duration signal (SPS creates a bit stream of repeated narrow-band transmissions in at known intervals), a long integration over a wide time window can be used to increase the receiver sensitivity and lower the possibility of a false alarm. The resulting time resolution, the reciprocal of the signal bandwidth (1/BW), can be improved using a second stage correlation enabled by the constrained time window discovered in the first stage correlation.

FIG. 10a graphically depicts the time domain search for signal correlation (a simultaneous search is preformed in the frequency domain) over a wide time window 1002. The correlation axis 1001 is the x-axis while the time axis 1003 is the y-axis. The correlation signal 1000 is searched for a correlation peak over the alarm threshold 1004. The highest correlation peak 1005 is over the alarm threshold 1004. The received time 1006 of the highest peak 1005 is selected as the center time for the second stage correlation depicted in FIG. 10b. The secondary time search window 1007 for the second stage correlation is constrained by the reciprocal of the signal bandwidth (1/BW).

Figure 10B:
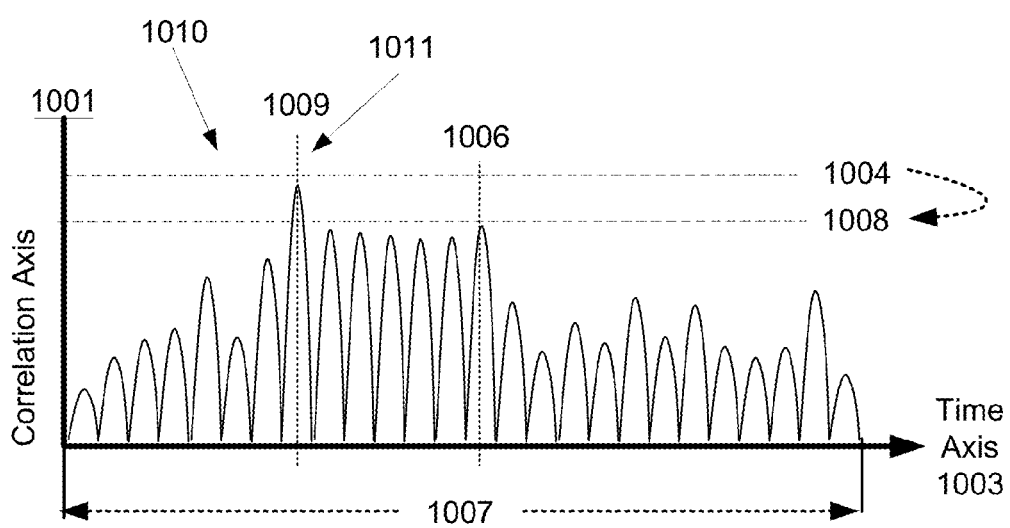

FIG. 10b is a graphical depiction of the second stage of a 2 stage correlation process made possible by the use of the comparatively narrowband signal and the 3GPP-defined Sounding Reference Signal (SRS) function to enable a network-based location. Since the SRS creates a short duration, but wide bandwidth signal, long integration times are not feasible without repeating SRS bursts, resulting in significant impact to the wireless communications system.

However; when both the narrowband signal component and the wideband SRS are commanded to be used in the uplink transmission from the UE of interest, the use of the SPS signal can be used to define a limited time window with a span of reciprocal of the signal bandwidth (1/BW). This time window is then used to define the search space for the $2^{nd}$ stage correlation.

FIG. 10b graphically depicts the time domain search for signal correlation (a simultaneous search is preformed in the frequency domain) over a constrained secondary time search window 1007. The correlation axis 1001 is the x-axis while the time axis 1003 is the y-axis. The correlation signal segment 1010 is searched for a correlation peak over the secondary alarm threshold 1008. The secondary alarm threshold 1008 is set to a lower confidence since the signal segment 1010 is less likely to include false alarms in the constrained search window 1007. The constrained search window 1007 is searched for correlation signals that exceed the secondary alarm threshold 1008. The time difference of arrival is determined by the time 1009 greatest magnitude correlation peak 1011. The a correlation peak 1009 found in this second stage need not be at the same time as the original correlation peak received time 1006 found in the first pass.

Figure 11:
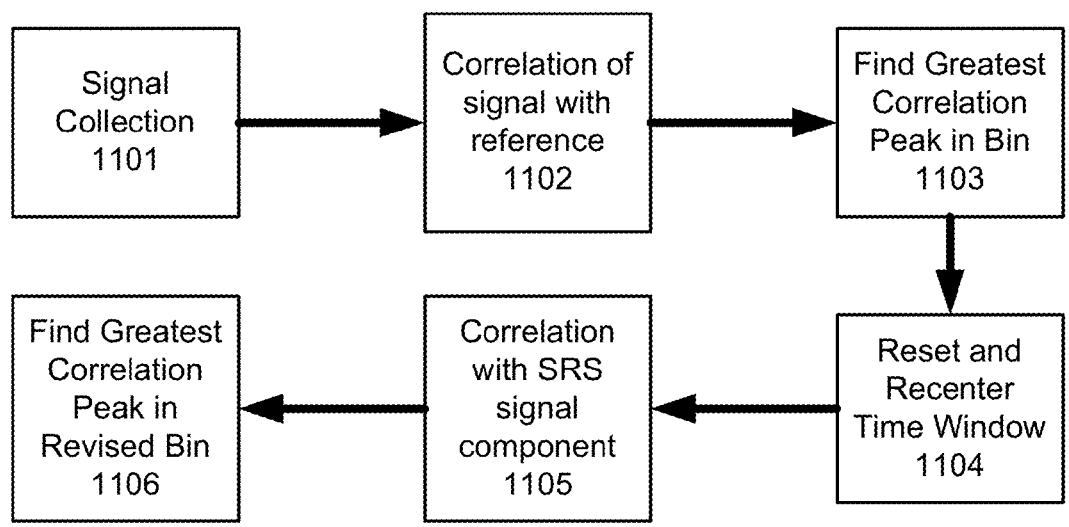
FIG. 11 depicts the use of a two-pass correlation process, where the narrowband signal (e.g., as created using the LTE SPS function) is first evaluated to create a limited time window for the second pass, in which the wideband SRS signal is correlated within the computed time window allowing better timing resolution at a lower correlation threshold.

FIG. 11 depicts the use of a two-pass correlation process where the narrowband signal (e.g. as created using the LTE SPS function) is first evaluated to create a limited time window for the second pass where the wideband SRS signal is correlated within the computed time window allowing better timing resolution (and thus better time-difference-of-arrival resolution) at a lower correlation threshold.

In the first stage, the uplink signal must be collected by the LMUs in the vicinity of the UE of interest 1101. The collected uplink signals are correlated against a high quality reference signal 1102 (such as collected by the LMU in closest proximity to the UE of interest). The correlation signal is searched in time and frequency for the highest correlation 1103.

The second stage begins with a secondary time search window being reset to center on the time-difference-of-arrival determined in the $1^{st}$ stage. The secondary time search window width is set to the reciprocal of the transmission bandwidth (1/BW) used by the UE of interest. The known wideband signal component created using the SRS function is then correlated with the LMU received signal 1105. The correlation signal is searched in time and frequency for the highest correlation over the secondary alarm threshold, the time of the maximum correlation pack is the TDOA reported for the local LMU 1106.

Conclusion

The true scope the present invention is not limited to the specific embodiments disclosed herein. For example, the foregoing disclosure of illustrative embodiments of a wireless location system and associated wireless communications system uses explanatory terms, such as LMU, eNodeB, eSMLC, LTE, SC-FDMA, and the like, that refer to structures, protocols and technical standards which represent exemplary, and in some cases presently preferred, implementations of the inventive concepts described herein, but these are by no means intended to limit the invention. Accordingly, except as they may be expressly so limited, the scope of protection of the following claims is not intended to be limited to the specific embodiments described above.

References

The following documents contain additional background information. Copies of these, or of selected portions for voluminous documents, will be submitted with an Information Disclosure Statement and made available for review as part of the prosecution history of this application.

1. 3GPP TR 21.905: "Vocabulary for 3GPP Specifications";
2. 3GPP TR 23.891 "Evaluation of LCS Control Plane Solutions for EPS";
3. 3GPP TS 36.201 Evolved Universal Terrestrial Radio Access (E-UTRA); LTE physical layer; General description (R9.0.0);
4. 3GPP TS 36.211 Evolved Universal Terrestrial Radio Access (E-UTRA); Physical channels and modulation (R9.0.0);
5. 3GPP TS 36.213 Evolved Universal Terrestrial Radio Access (E-UTRA); Physical layer procedures (R9.0.0);
6. 3GPP TS 36.300 Evolved Universal Terrestrial Radio Access (E-UTRA) and Evolved Universal Terrestrial Radio Access Network (E-UTRAN); Overall description; Stage 2 (R9.0.0);
7. 3GPP TS 36.302 Evolved Universal Terrestrial Radio Access (E-UTRA); Services provided by the physical layer (R9.0.0);
8. 3GPP TS 36.305 Evolved Universal Terrestrial Radio Access Network (E-UTRAN); Stage 2 functional specification of User Equipment (UE) positioning in E-UTRAN (R9.0.0);
9. 3GPP TS 36.355 Evolved Universal Terrestrial Radio Access (E-UTRA); LTE Positioning Protocol (LPP) (R9.0.0);
10. 3GPP TS 36.410 Evolved Universal Terrestrial Radio Access Network (E-UTRAN); S1 layer 1 general aspects and principles (R9.0.0);
11. 3GPP TS 36.420 Evolved Universal Terrestrial Radio Access Network (E-UTRAN); X2 layer 1 general aspects and principles (R9.0.0);
12. 3GPP TS 36.455 Evolved Universal Terrestrial Radio Access (E-UTRA); LTE Positioning Protocol A (LPPa) (R9.0.0);
13. 3GPP TS 36.321 Evolved Universal Terrestrial Radio Access (E-UTRA); Medium Access Control (MAC) protocol specification;
14. 3GPP TS 36.321 Evolved Universal Terrestrial Radio Access (E-UTRA); Medium Access Control (MAC) protocol specification;
15. U.S. Pat. No. 7,689,240, "Transmit-power control for wireless mobile services";
16. U.S. Pat. No. 6,519,465, "Modified transmission method for improving accuracy for E-911 calls";
17. U.S. Pat. No. 6,463,290, "Mobile-assisted network based techniques for improving accuracy of wireless location system";
18. U.S. Pat. No. 6,334,059, "Modified transmission method for improving accuracy for e-911 calls";
19. U.S. Pat. No. 6,115,599, "Directed retry method for use in a wireless location system";
20. U.S. Pat. No. 6,782,264 B2, "Monitoring of Call Information in a Wireless location system";
21. U.S. Pat. No. 7,167,713, "Monitoring of call information in a wireless location system";
22. U.S. patent application Ser. No. 11/150,414, "Advanced triggers for location-based service applications in a wireless location system";
23. U.S. patent application Ser. No. 11/948,244, "Automated Configuration of a Wireless location system";
24. U.S. patent application Ser. No. 11/736,902, "Sparsed U-TDOA Wireless Location Networks".

We claim:

1. A method for improving receiver resolution in a network-based wireless location system (WLS) associated with a single carrier frequency-division multiple access (SC-FDMA) based wireless communications network that relies on dynamic scheduling of physical resources in both a frequency domain and a time domain, wherein both downlink and uplink radio resources are under control of an eNodeB (eNB), wherein the eNB grants uplink time and frequency allocations for each user equipment device (UE) by assigning resource blocks (RB), comprising:

collecting an uplink signal from a UE using a location measuring unit (LMU) in the vicinity of the UE;
correlating the collected uplink signal against a reference signal to produce a first correlation signal;

identifying a first greatest correlation peak within the first correlation signal corresponding to a first particular time and frequency, wherein the first particular time is identified as a first time-difference-of-arrival (TDOA) value, and wherein the uplink signal from the UE is characterized by a first bandwidth (BW) that is less than or equal to the bandwidth of the RB assigned to the UE;

forming a secondary time search window centered on the first TDOA value and having a width set to the reciprocal of the first bandwidth (1/BW) used by the UE;

correlating a sounding reference signal (SRS) burst transmitted by the UE against the uplink signal collected by the LMU to produce a second correlation signal, wherein the SRS burst is transmitted by the UE in a single predefined orthogonal frequency division multiplexing (OFDM) symbol period of a subframe, and wherein the SRS burst is characterized by a bandwidth that is broader than the bandwidth of the RB assigned to the UE;

identifying a second greatest correlation peak within the second correlation signal, wherein the second correlation peak is identified as a second TDOA value;

and reporting the second TDOA value for the LMU.

2. The method recited in claim 1, wherein the eNB instructs the UE to transmit the SRS.

3. The method recited in claim 2, wherein the second TDOA value is more accurate than the first TDOA value.

4. The method recited in claim 3, wherein the eNB instructs the UE to transmit the SRS burst during time-based location measurements, and multiple LMUs collect radio frequency (RF) data over the bandwidth of the SRS burst, thereby enabling more accurate time measurements in a multi-path environment.

5. The method recited in claim 4, wherein the UE communicates over an air interface to a serving eNB, wherein the air interface comprises an OFDM-based downlink and an SC-FDMA-based uplink; and wherein the SRS burst is transmitted in a known time/frequency portion of an OFDM symbol, and the LMUs involved in a location receive the SRS burst from the UE.

6. The method recited in claim 1, further comprising: using a semi-persistent-scheduling (SPS) function to enable the LMU to integrate uplink signal measurements over a period of time, wherein the SPS function is employed to inform the UE of the uplink resources, including frequency and modulation scheme, to be used for uplink transmissions.

7. The method recited in claim 6, wherein the network-based WLS comprises a network of geographically distributed LMUs and is configured to use the SPS and SRS functions to enhance the sensitivity of the receivers to uplink signals transmitted by the UE.

8. The method recited in claim 7, further comprising tasking the WLS, identifying an LMU best suited to detect an uplink signal from the UE and serve as a reference LMU, and identifying additional LMUs to serve as cooperating LMUs, wherein the reference LMU and cooperating LMUs collect the uplink signal at synchronized times and the reference LMU extracts the reference signal and determines a reference signal time of arrival (TOA).

9. A method as recited in claim 8, further comprising:
employing the cooperating LMUs to collect baseband signals;
sending the reference signal TOA to a serving mobile location center (SMLC) over a digital data backhaul;
forwarding the reference signal to the cooperating LMUs over the digital data backhaul;
performing cross-correlation with the reference signal at the cooperating LMUs;
employing long integration lengths, relative to a symbol period, to provide the cooperating LMUs additional processing gain; and
sending time-based measurements from the co-operating LMUs to the SMLC.

10. A network-based wireless location system (WLS) associated with a single carrier frequency division multiple access (SC-FDMA)-based wireless communications network that relies on dynamic scheduling of physical resources in both a frequency domain and a time domain, wherein both downlink and uplink radio resources are under control of an eNodeB (eNB), wherein a user equipment device (UE) communicates over an air interface to a serving eNB, wherein the air interface comprises an orthogonal frequency division multiple access (OFDMA)-based downlink and an SC-FDMA-based uplink, and wherein the eNB grants uplink time and frequency allocations for each UE by assigning resource blocks (RB), comprising:
a network of geographically dispersed location measuring units (LMUs); and
a serving mobile location center (SMLC) configured:
to communicate with the eNB and to instruct the UE to be located, using the eNB, to transmit a sounding reference signal (SRS) burst, wherein the SRS burst is transmitted by the UE in a single predefined orthogonal frequency division multiplexing (OFDM) symbol period, and wherein the SRS burst is characterized by a bandwidth that is broader than the bandwidth of the RB assigned to the UE; and
to use the SRS burst transmitted by the UE to enable a location measuring unit to collect uplink signal measurements over a bandwidth that is broader than the bandwidth of the RB assigned to the UE; wherein the WLS is configured to perform a two-pass correlation process comprising:
collecting an uplink signal from the UE using an LMU in the vicinity of the UE;
correlating the collected uplink signal against a reference signal to produce a first correlation signal;
identifying a first greatest correlation peak within the first correlation signal corresponding to a first particular time and frequency, wherein the first particular time is identified as a first time-difference-of-arrival (TDOA) value;
forming a secondary time search window centered on the first TDOA value and having a width set to the reciprocal of a first bandwidth (1/BW) used by the UE;
correlating the SRS burst transmitted by the UE against the uplink signal collected by the LMU to produce a second correlation signal;
identifying a second greatest correlation peak within the second correlation signal, wherein the second correlation peak is identified as a second TDOA value;
and reporting the second TDOA value for the LMU.

11. The network-based WLS recited in claim 10, wherein the SMLC is configured to use the eNB to instruct the UE to transmit the SRS burst, and the UE's SRS burst is used by the WLS to enhance the time resolution of the collected uplink signal.

12. The network-based WLS recited in claim 10, wherein the SMLC is further configured to use the eNB to instruct the UE to transmit the SRS burst during uplink time-difference-of-arrival (U-TDOA) locations, and wherein multiple LMUs collect radio frequency (RF) data over the bandwidth of the SRS burst, thereby enabling more accurate TDOA measurements in a multi-path environment.

13. The network-based WLS recited in claim 12, wherein the SRS burst is transmitted within a known time/frequency portion of an OFDM symbol, and the LMUs involved in a location receive the SRS burst from the UE.

* * * * *